March 8, 1966  R. L. SILBERMAN  3,239,651
HEATING UNIT

Filed Aug. 21, 1963  3 Sheets-Sheet 1

INVENTOR.
Robert L. Silberman
BY
Atty.

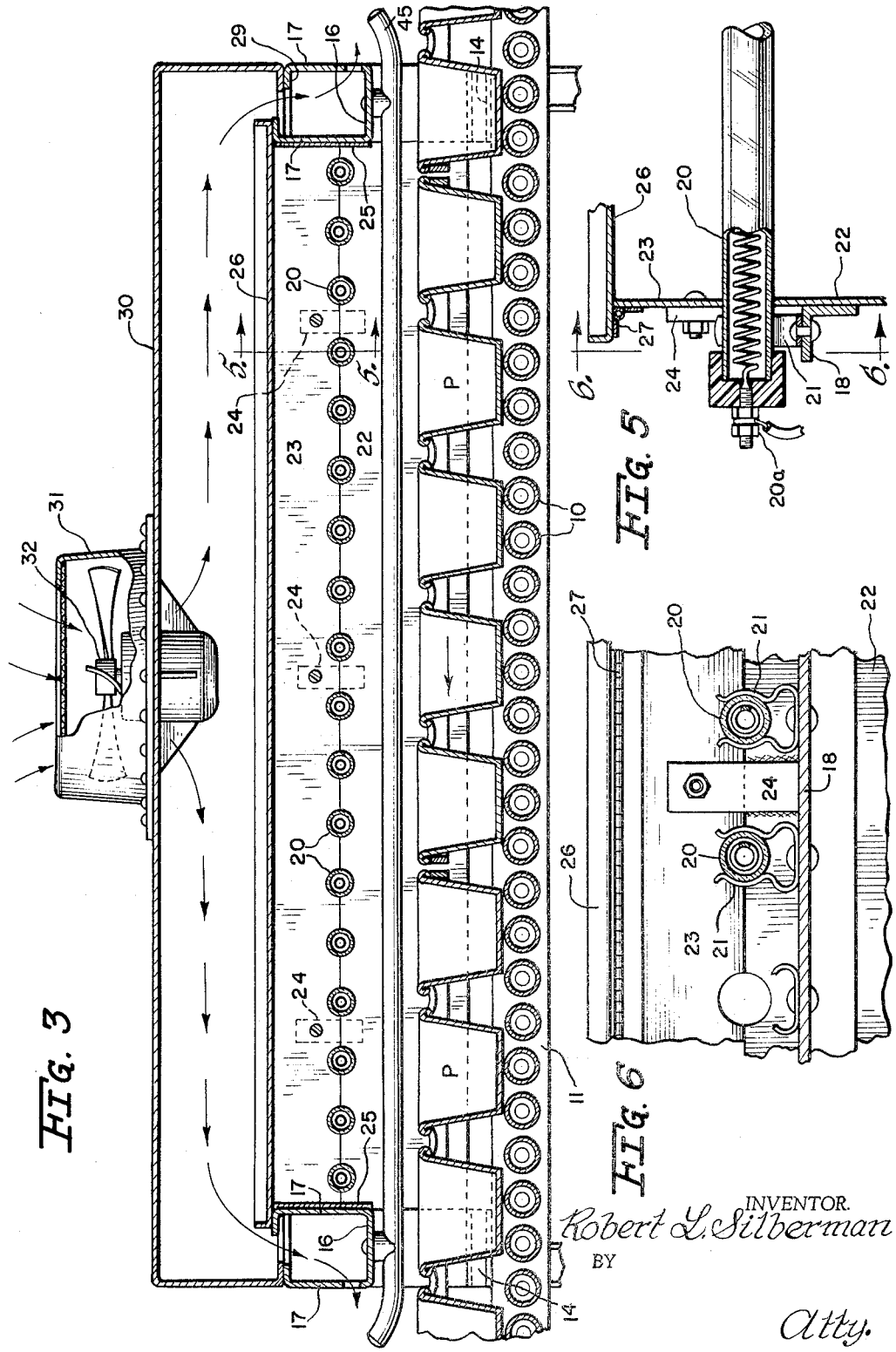

March 8, 1966  R. L. SILBERMAN  3,239,651
HEATING UNIT
Filed Aug. 21, 1963  3 Sheets-Sheet 3
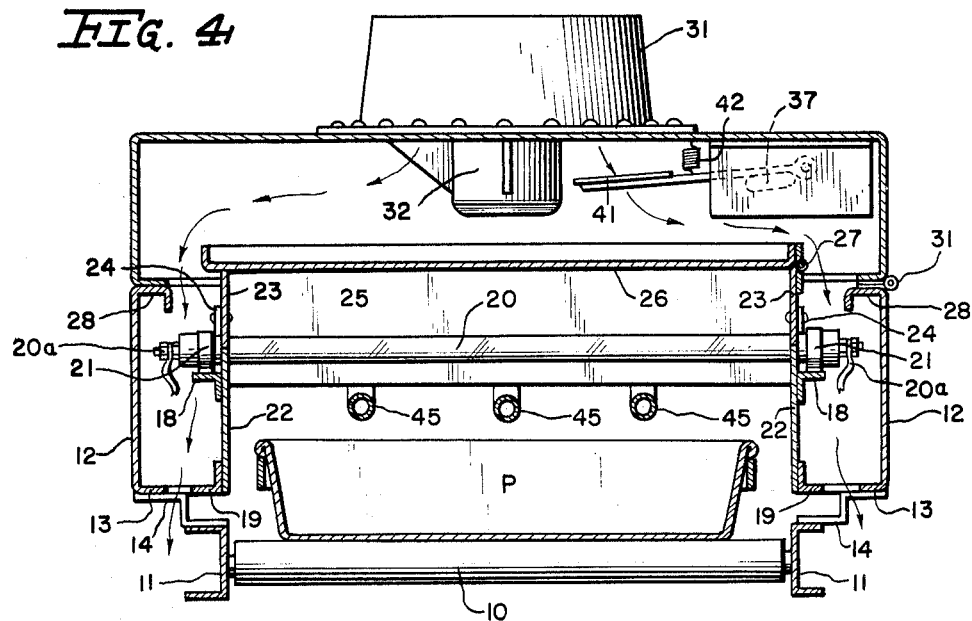
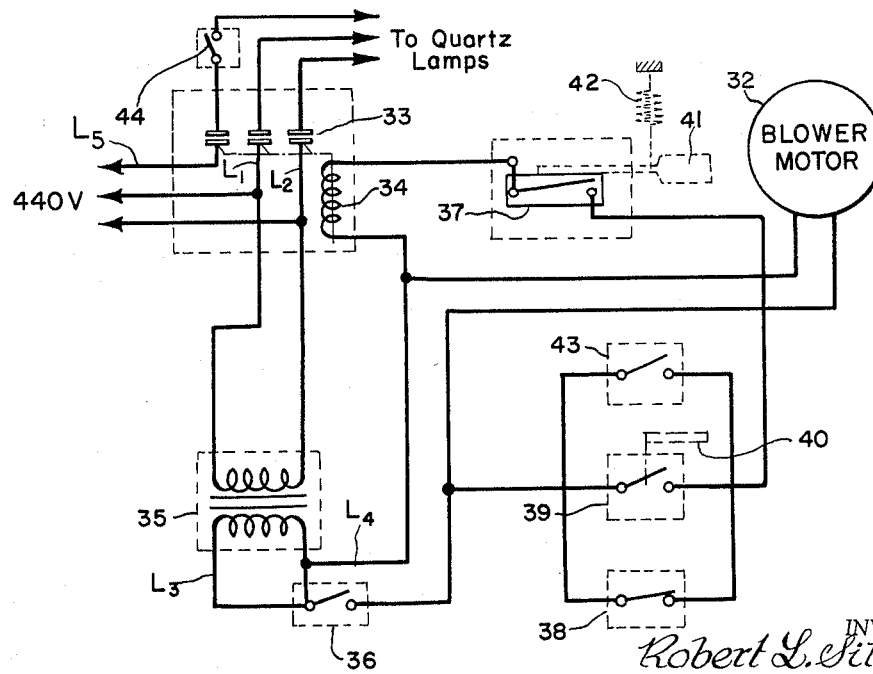
INVENTOR.
Robert L. Silberman
BY
Atty.

United States Patent Office 3,239,651
Patented Mar. 8, 1966

3,239,651
HEATING UNIT
Robert L. Silberman, Highland Park, Ill., assignor to Ekco Products Company, Chicago, Ill., a corporation of Delaware
Filed Aug. 21, 1963, Ser. No. 303,543
6 Claims. (Cl. 219—388)

The present invention relates to an oven and more particularly a radiant conveyor oven for installation in commercial baking plants for preheating baking pans while enroute to a dough loading station and preparatory to subjecting the bake pan and the dough mass contained therein to a proofing atmosphere.

Preheating of baking pans is desirable for bringing pan temperatures above the dew point of the proofing atmosphere whereby the pans are protected from condensation which forms when cold pans are put into a warm, wet proofing atmosphere. As a result of such protection, the loaf produced in the pan is readily released from the pan after the baking operation is completed and damage to the pan by corrosion or harmful action of moisture attacking release coatings applied to the pan are eliminated.

An oven for preheating baking pans forming the subject of this invention represents an improvement over heating units hitherto provided for such use in that it utilizes relatively short conveyor travel while raising the temperature quickly.

It is also an object of this invention to provide an oven as indicated incorporating safety features which will protect against overheating and consequent damage to the tin coating on such pans as well as to maintain room temperature conditions along outside surfaces of the unit while the unit is in operation.

Other features, advantages and objects of the invention will appear from the following disclosure in which:

FIG. 3 is an enlarged vertical section taken along line 3—3 of FIG. 1.

FIG. 4 is an enlarged vertical section taken along line 4—4 of FIG. 1.

FIG. 5 is a fragmentary enlarged section taken along line 5—5 of FIG. 3.

FIG. 6 is a fragmentary enlarged section taken along line 6—6 of FIG. 5.

FIG. 7 is a schematic view showing the control system used in operating the oven of this invention.

Figure 1:
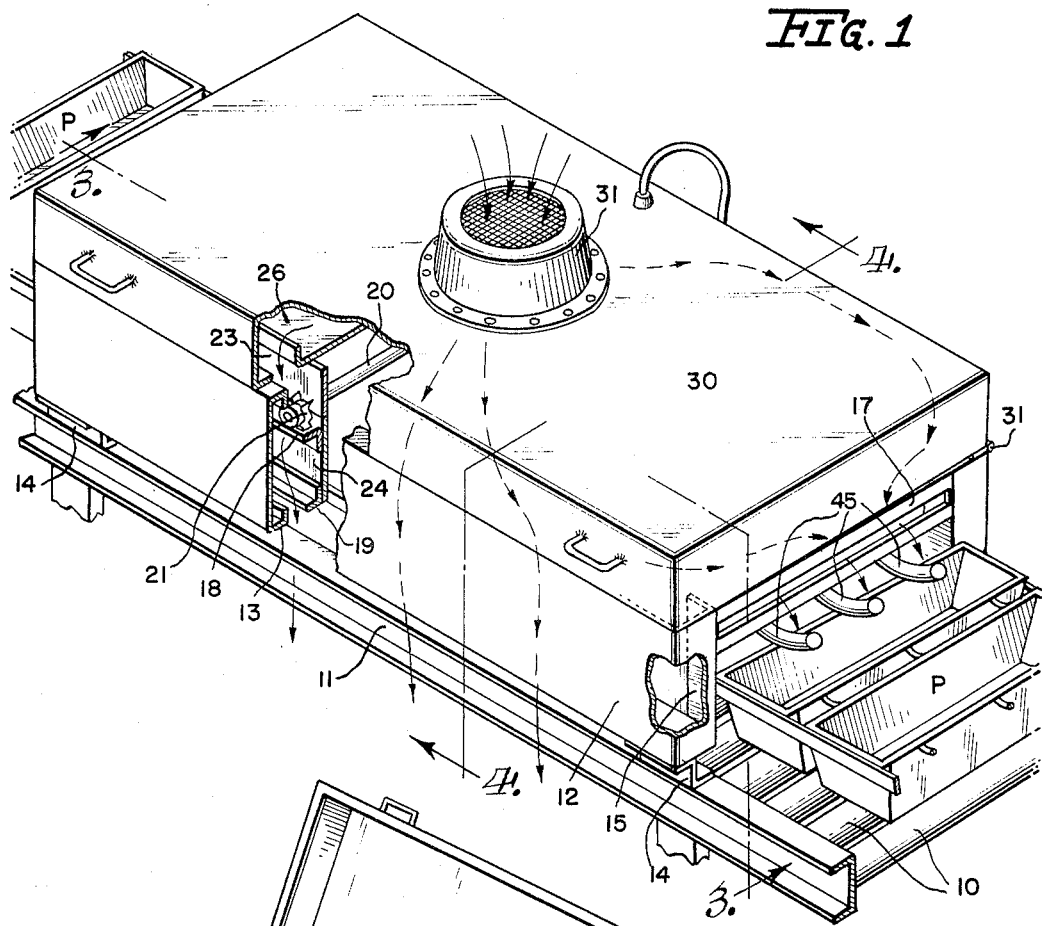
FIG. 1 is a perspective view of an oven embodying the present invention.
Figure 2:
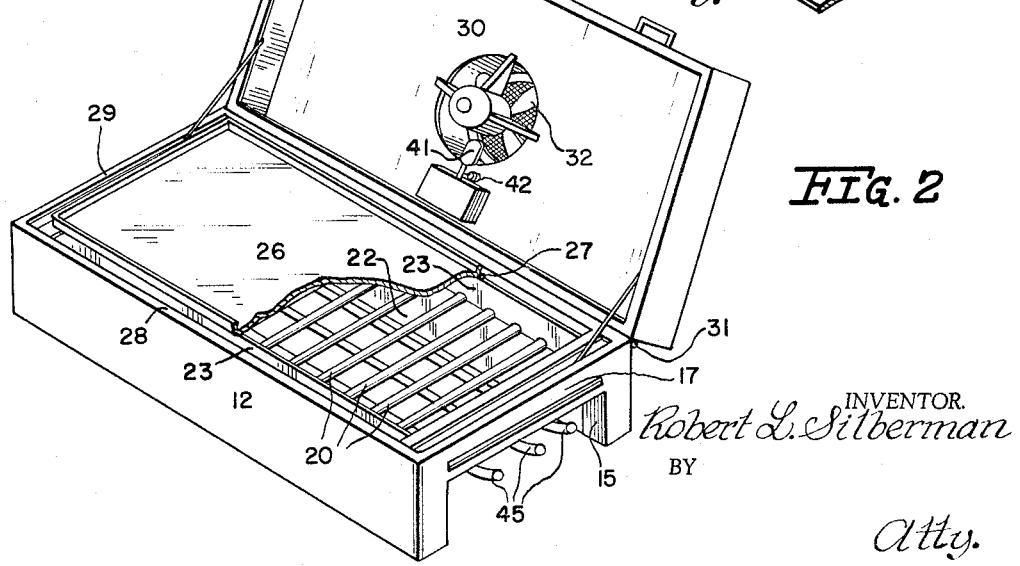
FIG. 2 is a similar view showing the oven as it appears when the interior of the oven is uncovered.

Referring now to the drawings, a radiant oven forming the subject of this invention is illustrated therein in operative relation to a typical conveyor on which multiple pan units P of conventional style as used in commercial baking operations are carried along a predetermined path at a selected rate of speed to a station in which a dough mass is initially deposited in the pans of the pan unit for ultimate delivery to a dough proofing atmosphere. In the conveyor installation as shown in FIG. 1, the bottom of the pan unit has downward engagement with driven rollers 10 supported in spaced apart relation lengthwise of the path along which the pan unit is to be fed to the dough mass loading station via spaced parallel supporting rails 11, and while so carried by the rollers 10, each pan of the pan unit P is arranged so as to present its shortest dimension lengthwise of said path.

The oven as shown in the drawings includes an outer shell or housing having a pair of duplicate sheet metal side walls 12 disposed in spaced apart upright relation along lines parallel to the rails 11 of the pan conveyor, each wall 12 having a flange 13 extending angularly inwardly from the lower edge thereof secured to rail 11 via a mounting bracket 14 to establish a fixed connection between the heating unit housing and the framework of the conveyor. Opposite upright end portions of each side wall 12 are bent along upright lines to present an inner stiffening web 15 in inwardly spaced parallel relation to the side wall 12 with which it is associated at opposite ends of said wall. Channel shaped sheet metal cross members having a downwardly facing horizontal web 16 and a pair of upright sides 17 joined in spaced parallel relation by said web are secured to the web 15 to form a bridge across the space between corresponding transversely aligned webs 15 at opposite ends of the walls 12. As shown, the horizontal web 16 of said cross members defines the upper limits of the opening between the side walls 12 through which pan units may enter and leave the area between said walls 12 via the conveyor straddled by said walls 12. Secured to the webs 15 along vertically spaced apart parallel lines extending lengthwise of the walls 12 are upper and lower angle members 18 and 19. Electric heating elements 20 in the form of radiant quartz tubes are mounted in spaced apart relation lengthwise of the walls 12 so as to span the area between the angle members 18 and 19. Such mounting of the heating elements is accomplished via spring clip holders 21 secured to the upper angle members 18. Reflection panels 22 of suitable material secured to the upper and lower angle members 18 and 19 are notched along the upper edge thereof and reflector panels 23 secured to the upper angle member 18 via brackets 24 and forming upward extensions of the panels 22 have corresponding notches to define openings through which the heating elements extend for reception in the clip holders 21. End reflector panels 25 bridging the distance between the panels 22 and 23 are fixed to the sides 17 of the channel cross members along surfaces of the sides 17 facing said area between panels 22 and 23. The upper limits of the panels 23 and the end panels 25 are in horizontally coplanar relations and the area between said upper limits is closed by a top reflector panel 26 joined to the one of the upper reflector panels 23 via a hinge 27 as shown in FIG. 5. The panel 26 thus provides a closure which may be swung toward and away from a closure position to provide access to the heating elements when such access is required. The panels 22, 23, 25 and 26 constitute an inner heat reflecting housing.

Flanges 28 extending inwardly from the upper limits of the side walls 12 and flanges 29 along the upper edges of the outermost sides 17 of the cross member bridging the distance between the walls 12 and horizontally coplanar with the flanges 28 of said walls 12 define an opening which is closed by a hood 30. Hinges 31 connecting the hood 30 to one of the side walls 12 provide an axis about which the hood 30 may be swung toward and away from a seated position on the flanges 28 and 29 so as to provide convenient access to the hinged top reflector panel 26. It will be observed that the top wall of the hood 30 is at such upward distance from the top reflector panel 26 as to define a chamber therebetween which communicates with the area between the reflector panels 22 and 23 and the surfaces of the side walls 12 in outwardly opposed relation to said panels 22 and 23. A conduit 31 extending through the top wall of the hood 30 is provided with a motor driven blower 32 which is operable to drive air around the chamber between the top reflector panel 26 and the hood 30 and downwardly between the walls 12 and the reflector panels 22 and 23 opposite said walls 12 so as to lower the temperature in said area while the desired elevated temperatures are maintained within the zone of the oven under control of the heating elements 20.

Current is supplied to the heating elements 20 over suitable high voltage lines L1 and L2 via movable contactors 33 which when in closed position establish electrical connection between said high voltage lines and terminals 20a of the heating elements 20 by energization of a coil 34 of a switch actuating relay. Energization of said relay coil 34 is obtained by a circuit supplying current to lines L3 and L4 at a lower voltage through a transformer 35 connected to lines L1 and L2. A master switch 36 controls the circuit which supplies current over lines L3 and L4. The motor which drives the air blower 32 is energized upon closure of the master switch 36. While the master switch 36 is closed and while the motor of the air blower 32 is operating, current is supplied to the relay coil 34 via closed contacts of a mercury switch 37 and via current operated time delay means operable by flow of current over said lines L3 and L4 to interrupt flow of current to the coil 34 after the passage of current therethrough for a predetermined period of time. Such time operated delay means includes a warm-up switch 38 which is set to interrupt flow of current therethrough after termination of a 90 second time interval to allow the heating elements 20 to reach full heat capacity and a limit switch 39 which is set to interrupt flow of current therethrough after termination of said warm-up interval at 7 second time intervals. The limit switch 39 responds to actuation by a trigger 40 intercepting the path travelled by pans P on the conveyor and as long as said pans P are successively contacted by the trigger 40 at time intervals shorter than said 7 second interval, the circuit remains closed through said switch 39. Thus, if the pans P fail to move past the trigger at a rate within the limits of the time intervals at which the switch 39 is set to open, the flow of current to the heating elements 20 will stop and thereby protect the pans P against over exposure to the high temperature of said heating elements.

When the blower 32 ceases to operate, a pivoted paddle 41 in the path of air delivered by said blower is acted upon by a spring 42 to assume a retracted position and thus actuate the mercury switch 37 to a circuit opening position effective to interrupt flow of current to the coil 34 and thus deenergize the heating elements 20. Likewise, when the hood 30 is lifted from a closed position, the switch 37 is actuated by such movement of the hood 30 to interrupt flow of current to coil 34. Thus, while the blower fails to operate or while the hood is raised, the circuit containing the relay 34 is broken at the mercury switch 37 and thereby provide safeguards against injury to operators of the heating unit as well as damage to the pans during such incidents in the operation of the unit a manually operable override switch 43 when in "on" position is operative to maintain flow of current to the coil 34 in the circuit with which the trigger operated limit switch 39 is connected. This switch is turned on only in the event of failure of the limit switch.

The circuit controlling flow of current to the heating elements 20 may also include suitable controls 44 for adjusting the amount of power supplied to the heating elements and thereby varying the temperature of the heat delivered by said heating elements according to desired conditions.

The heating elements 20 are protected against contact with pans while said pans are within the confines of the oven via guard rails 45 secured to the webs 16 at opposite ends of the oven housing and extending lengthwise of the side walls 12.

A typical baking pan unit with which the present oven is operative may, for example, include a set of five pans, each having a top inside dimension of 9½ inches by 4¼ inches, a bottom inside dimension of 9 inches by 3⅝ inches and a depth dimension of 2¾ inches. Strapping members of conventional design applied to opposite end walls of the pans establish a rigid interconnection of said pans at a distance of ¾ inch apart along lines extending lengthwise of said strapping members. The rate at which said pan unit is propelled by said conveyor is synchronized with the rate at which dough pieces emerge from the discharge end of dough piece moulding equipment where such dough pieces are deposited in the pans. Accordingly, on the basis that such dough pieces are delivered by the moulding equipment at the rate of one hundred dough pieces per minute, the pans travel through the oven at a corresponding rate. It a heating unit incorporating this invention, wherein eighteen 1500 watt infra-red radiant quartz tubes of ⅝ inch diameter and of a length spanning the width of the unit and arranged in uniformly spaced apart relation along an area coextensive width 60 inches of lineal dimension of the conveyor, each pan, while travelling through said area at the rate of one hundred pans per minute, emerges from the discharge end of said area approximately six seconds after entering said area and by exposure to the full heat of said heating elements during such travel through said area, the bottom wall of the pan reaches a temperature of 235° F. within said six second time interval. Thus the use of an oven embodying the features of this invention not only provides for improved bakery production from the standpoint of properly conditioning the pans for entrance to the dough proofing area, and consequently protecting the pans from corrosion as well as damage to the release coatings on such pans, but it accomplishes these results with the use of minimum space and time requirements.

What is claimed is:

1. An oven for use in conditioning baking pans for entry to dough proofing atmospheres while said pans are undergoing conveyance to said atmosphere, said oven having an outer housing defined by a pair of duplicate upright side walls arranged in straddling relation to the path travelled by said pans and a hood spanning the area between said side walls in overhead relation to said path of said pans, high temperature electric heating elements in fixed downwardly spaced relation to said hood, means for directing the heat produced by said heating elements toward the path of said pans including an inner reflector housing having upright side panels fixed in inwardly spaced relation to said side walls of the outer housing and a closure spanning the area between said side panels of the reflector housing in downwardly spaced relation to said hood of the outer housing, a continuous passageway between the area above said closure of the inner reflector housing and the area along the outer surfaces of the side panels of the inner reflector housing, an air duct in said hood of the outer housing and air moving means for establishing a downwardly directed flow of air through said continuous passageway whereby said outer housing is cooled, and means for energizing said heating elements including a source of electric current and a switch for controlling the flow of current from said source to said heating elements, and switch actuating means operable in response to movement of pans through said oven at a predetermined frequency of movement and effective via said switch to interrupt flow of current to said heating elements when said frequency of movement is less than said predetermined frequency.

2. An oven according to claim 1, wherein said hood is pivotally mounted for swinging movement between a lowered position in closing relation to the area between the side walls of the outer housing and a raised position in opening relation to said area, and the circuit through which said heating elements are supplied with current from said current source includes a second switch operable to deenergize said circuit when the hood is moved from lowered toward raised position.

3. An oven according to claim 1, wherein the circuit through which said heating elements are supplied with current from said source includes a second switch operable to deenergize said circuit when the operation of said air moving means is stopped.

4. In an oven according to claim 1, wherein said closure of the reflector housing is pivotally mounted for swinging movement between a lowered position and a raised position to provide access to said heating elements via the opening defined by the upper limits of said side panels of the reflector housing.

5. In an oven according to claim 1, wherein said heating elements comprise a series of quartz tubes arranged along spaced parallel lines extending transversely of the path of pans travelling through said oven.

6. In an oven according to claim 1, wherein said heating elements comprise a series of quartz tubes arranged along spaced parallel lines extending transversely of the path of pans travelling through said oven and guard rails are fixed to said outer housing along lines parallel to said path of the pans and in spaced underlying relation to said tubes.

References Cited by the Examiner

UNITED STATES PATENTS

| | | | |
|---|---|---|---|
| 1,217,229 | 2/1917 | Smith | 219—364 |
| 2,347,407 | 4/1944 | Goodwin et al. | 219—388 X |
| 2,368,738 | 2/1945 | Bergman | 200—61.41 X |
| 2,454,334 | 11/1948 | Moir | 219—364 X |
| 2,454,370 | 11/1948 | Beaubien | 219—388 |
| 2,479,913 | 8/1949 | Doyle | 219—388 |
| 2,549,619 | 4/1951 | Miskella | 219—411 X |
| 2,693,522 | 11/1954 | Martin et al. | 219—388 X |
| 3,038,987 | 6/1962 | Dow et al. | 219—343 |
| 3,059,086 | 10/1962 | Pedersen | 219—343 |
| 3,164,717 | 1/1965 | Kaufman | 219—388 |

ANTHONY BARTIS, *Acting Primary Examiner.*

RICHARD M. WOOD, *Examiner.*

R. F. STAUBLY, *Assistant Examiner.*